United States Patent [19]

Date et al.

[11] Patent Number: 5,473,748
[45] Date of Patent: Dec. 5, 1995

[54] METHOD AND APPARATUS FOR AUTOMATICALLY SELECTING PROCESS INFORMATION FOR EXECUTION DURING PRINTING OF A PAGE

[75] Inventors: Jitsukazu Date; Koji Hatada; Norihiko Nakamura, all of Tenjinkitamachi, Japan

[73] Assignee: Dainippon Screen Mfg. Co., Ltd., Japan

[21] Appl. No.: 157,704

[22] Filed: Nov. 24, 1993

[30] Foreign Application Priority Data

Dec. 2, 1992 [JP] Japan ................................ 4-350325

[51] Int. Cl.⁶ ............................................. G06F 15/00
[52] U.S. Cl. ................................ 395/162; 395/164
[58] Field of Search ................................ 395/109, 110, 395/115, 116, 131, 132, 150, 162–164; 358/296, 447, 448, 450–453; 345/112, 141, 143, 144, 185, 192, 194

[56] References Cited

U.S. PATENT DOCUMENTS 5,191,623  3/1993  Moriyo .................................. 358/451

FOREIGN PATENT DOCUMENTS 0192927  9/1986  European Pat. Off. ........ G06F 15/72
0397242  11/1990  European Pat. Off. ........ G06F 15/20
0459711  12/1991  European Pat. Off. ........ G06F 15/72

OTHER PUBLICATIONS

Samara, et al. Proceedings of the European Computer Graphics Conference and Exhibition, "*Constructive Page Description Opening Up the Prepress World*", Sep. 2, 1991, pp. 275–289.

Primary Examiner—Mark R. Powell
Assistant Examiner—Kee M. Tung
Attorney, Agent, or Firm—Ostrolenk, Faber, Gerb & Soffen

[57] ABSTRACT

A method and apparatus for automatically selecting process information for a plurality of image parts, in which a CPU, in an automatic reproduction process routine, determines a positional relation between two image parts in a page image based on figure vector data corresponding to the two image parts (S110). A rule including data such as vertical relative positions, types, and colors of the two image parts as a condition part and process information as an action part is previously stored as rule base RB in an external hard disk unit. When the two image parts are in a non-separate relation, the CPU reads attribute data of the two image parts in the non-separate relation (S150), and determines final process information by exchanging the attribute data with rule base RB (S190 and S200). The results of the processing including the final process information are then stored as a process information table TBL3.

20 Claims, 16 Drawing Sheets

Fig. 5(A) OVERLAPPING
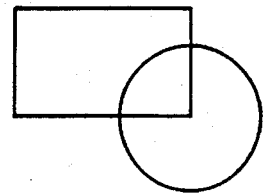
Fig. 5(B) INCLUDING
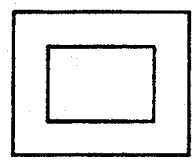
Fig. 5(C) IDENTICAL
Fig. 5(D) CONTACT
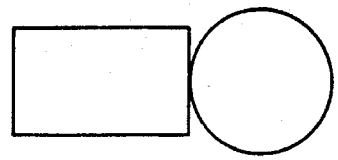
Fig. 5(E) SEPARATE
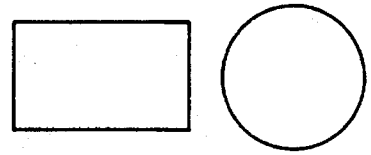

Fig. 7

TBL1

| RECORD | POSITIONAL RELATION | ADDRESS OF PART A | ADDRESS OF PART B |
|---|---|---|---|
| 1 | OVERLAPPING | 100200 | 100100 |
| 2 | SEPARATE | 100200 | 100300 |
| 3 | SEPARATE | 100200 | 100400 |
| 4 | SEPARATE | 100100 | 100300 |
| 5 | SEPARATE | 100100 | 100400 |
| 6 | OVERLAPPING | 100300 | 100400 |
| ⋮ | ⋮ | ⋮ | ⋮ |
| N |  |  |  |

Fig. 8

TBL2

|  | PART A(i) | PART B(i) |
|---|---|---|
| VERTICAL RELATIVE POSITIONS | UPPER | LOWER |
| TYPES | TINT | TINT |
| COLOR (Y, M, C, K) | 0, 50, 10, 0 | 0, 10, 50, 0 |

Fig. 10

| RECORD | PROCESS INFORMATION | ADDRESS OF PART A | ADDRESS OF PART B | ATTRIBUTE DATA | |
|---|---|---|---|---|---|
| | | | | POSITION OF SPREADING PART | COLOR OF SPREAD AREA |
| 1 | TRAPPING | 1000200 | 1000100 | UPPER | 0,50,50,0 |
| 2 | TRAPPING | 1000300 | 1000400 | LOWER | 0,20,50,0 |
| 3 | OUTLINE | 1000500 | 1000600 | UPPER | 0,0,0,0 |
| 4 | OVERPRINT-ING | 1000600 | — | — | 0,0,0,100 |
| M | ... | ... | ... | ... | ... |

PRIORITY I1 < I2 < I3

METHOD AND APPARATUS FOR AUTOMATICALLY SELECTING PROCESS INFORMATION FOR EXECUTION DURING PRINTING OF A PAGE

BACKGROUND OF THE INVENTION

1. Field of the Invention

The present invention relates to a method and apparatus for image processing and, in particular, to a method and apparatus for selecting process information to be executed during the printing of a page which includes a plurality of image parts.

2. Description of the Related Art

Image processing systems have recently been developed that allow a computer-aided page make-up process. In such image processing systems, an operator inputs into the system, with a scanner or like element, a variety of image data that represent image parts, such as characters, figures, and pictures. The operator then lays out the image parts as a page for printing through interaction with the image parts that are displayed on a monitor screen.

As a part of the page make-up process, in prepress processing, ornamental effects are selected which are to be included in the final printing of the pages stored in the system. Such ornamental effects, generally known as prepress process information, include outline types, white-open faces, and overlay in an overlapped area between a character and a picture.

The selection of such ornamental effects is inputted to and then memorized as prepress process information in the image processing system. The prepress process information is selected and stored by the system according to instructions given by the operator. The operator follows prepress instructions, which are provided to him and include a variety of process information that are to be selected for the images stored in the system. The operator selects the desired process information for printing with the specified image parts, i.e., the target image parts, through interaction with the monitor screen with a pointing device such as a mouse.

The conventional technique described above, however, requires manual operations by an operator, such as manually moving the mouse for selecting the desired process information, which consume a relatively long period of time. Moreover, such manual operations could cause variations in the accuracy or the precision by which the process information is specified for the various image parts based upon the performance of the operator. Such situations could sometimes lead to undesirable or incorrect printing.

SUMMARY OF THE INVENTION

Accordingly, an object of the present invention is to provide an efficient and stable apparatus for the selection of process information.

The present invention is directed to an apparatus for selecting process information representing a specific prepress process for an image of a page including a plurality of image parts. The apparatus includes an image part memory for storing (i) respective figure data representing a shape and a position of each of the plurality of image parts in the image of a page, (ii) respective attribute data representing a type and a color of each of the plurality of image parts, and (iii) respective ordinal data representing an order of laying out each of the plurality of image parts in the image of a page; selection means for selecting respective figure data corresponding to two image parts of the plurality of image parts out of the figure data stored in the image part memory; positional relation judging means for judging whether the two image parts corresponding to the selected figure data are separated from one another on the image of a page; attribute data reading means for reading respective attribute data and respective ordinal data corresponding to the two image parts from the image part memory if the two image parts are not separated on the image of a page; process information allocation means for allocating process information to the two image parts based on the attribute data and the ordinal data corresponding to the two image parts; and a process information memory for storing the process information allocated to the two image parts by the process information allocation means.

In the preferred embodiment, the apparatus further comprises: a rule memory for storing an inference rule which has the order of laying out of image parts and types and colors of image parts as a condition part, and the process information as an action part; and wherein the process information allocation means comprises: rule collating means for applying the inference rule to the attribute data and the ordinal data for the two image parts to obtain the process information for the two image parts.

Preferably the color in the attribute data is expressed by dot percents of color plates of yellow, magenta, cyan, and black, and the apparatus further comprises: color density computing means for computing a color density of each of the two image parts based on the dot percents of the color plates; and spreading part determination means for selecting a spreading image part out of the two image parts based on the color densities and the types in the attribute data of the two image parts, the spreading image part being to be spread to generate a spread area, and generating spreading side data corresponding to the spreading image part.

Moreover, the apparatus further comprises: image part generating means for generating the spread area based on the two figure data for the two image parts and the spreading side data, the spread area being subject to a prepress process represented by the process information for the two images.

According to another aspect of the present invention, the apparatus further comprises: spread area color determination means for determining a color of the spread area based on colors of the two image parts. In another embodiment, the process information includes first through third process titles, the first process title indicating a process of producing an overlapping area between two image parts, the second process title indicating a process of making a margin of a predetermined width around a contour of an image part, and the third process title indicating a process of printing a black character over a background. The process information allocation means further comprises: means for giving a giving a first priority to the third process title, and a second priority to the second process title, and selecting one process title of the process information according to the priorities when the rule collating means extracts at least two process titles out of the first through third process titles.

In the preferred embodiment, the ordinal data represents storing positions of the figure data in the image part memory.

According to still another aspect of the present invention, the apparatus further comprises: process information display means for displaying a process title included in the process information for the two image parts in the vicinity of the two image parts displayed on a display device, and two line segments connecting the process title with the two image parts, respectively.

In the preferred embodiment, the apparatus further comprises: image part generating means for generating a new image part between the two image parts, the new image part being subject to a prepress process represented by the process information for the two image parts.

Preferably, the apparatus further comprises: recording means for recording the new image part, and the two image parts corresponding to the figure data selected by the selection means on a recording medium.

The present invention is also directed to a method for selecting process information representing a specific prepress process for an image of a page including a plurality of image parts. The method comprises the steps of: (a) storing (i) respective figure data representing a shape and a position of each of the plurality of image parts in the image of a page, (ii) respective attribute data representing a type and a color of each of the plurality of image parts, and (iii) respective ordinal data representing an order of laying out of each of the plurality of image parts in the image of a page; (b) selecting respective figure data corresponding to two of the image parts of the plurality of image parts out of the aforementioned figure data; (c) judging whether the two image parts corresponding to the figure data selected in step (b) are separated from one another on the image of a page; (d) reading respective attribute data and respective ordinal data corresponding to the two image parts stored in step (a) if the two image parts are not separated on the image of a page; (e) allocating process information to the two image parts based on the attribute data and the ordinal data corresponding to the two image parts; and (f) storing the process information allocated to the two image parts in step (e).

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5(A)–5(E) show examples of positional relationship between two image parts;

FIG. 7 shows an inter-image part relationship table TBL1;

FIG. 8 shows an attribute table TBL2;

FIG. 10 shows a process information table TBL3;

DETAILED DESCRIPTION OF THE PREFERRED EMBODIMENT OF THE INVENTION

Figure 1:
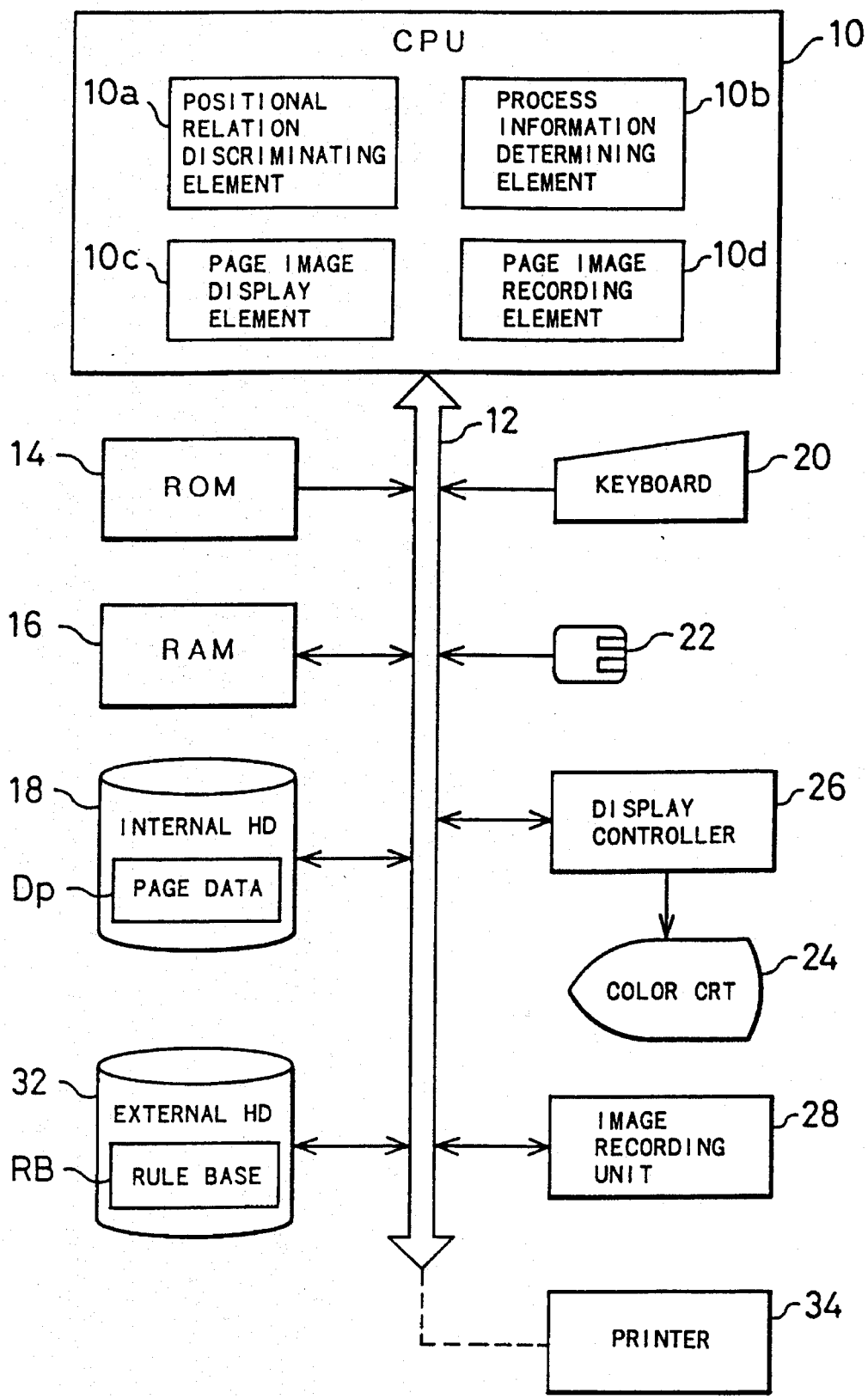
FIG. 1 is a block diagram showing an automatic reproduction processing apparatus according to the invention.

FIG. 1 shows an automatic reproduction processing apparatus according to the present invention, including a CPU (central processing unit) 10, a ROM (read only memory) 14, a RAM (random access memory) 16, and an internal hard disk unit 18, which are connected to one another via a bus line 12. The bus line 12 is further connected with input devices, such as a keyboard 20 and a mouse 22, and output devices, such as an image recording unit 28, a color CRT (cathode ray tube) display 24 via display controller 26 and a printer 34 (shown schematically).

The internal hard disk unit 18 stores page data Dp, which correspond to recorded images. One unit of the page data Dp represents an image of one page (hereinafter referred to as "page image"). Each page image includes a plurality of image parts, which are laid out on the page image at predetermined positions. Each image part has figure vector data or mask data, representing mask shape and position of the image part on the page, and attribute data representing type (e.g., picture, character, tint) and color of the image part.

An external memory device, such as an external hard disk unit 32, is also connected to the bus line 12. The external hard disk unit 32 stores a rule base RB, which defines rules for selecting the process information, in accordance with whether two image parts are to be processed or one image part and a background image. The rule base RB and the CPU 10 are structured and arranged so as to communicate with each other, thereby constituting an expert system.

The CPU 10 executes programs that are previously stored in the ROM 14, thereby activating the functions of a positional relation discriminating element 10a, a process information determining element 10b, a page image display element 10c, and a page image recording element 10d. The positional relation discriminating element 10a and the process information determining element 10b automatically select prepress process information for a plurality of image parts in a page image. Such process information include "Trapping" process information, "Outline" process information, and "Overprinting" process information. The page image display element 10c then displays the page image on the color CRT display 24, together with the process information, which was automatically selected by the positional relation discriminating element 10a and process information determining element 10b, and the page image recording element 10d outputs the page image to the image recording unit 28.

The "Trapping" process information produces an overlapped area between two image parts, including one or a plurality of pictures, characters, or the like. The "Outline" process information makes a margin having a predetermined width around the contour of an image part. The "Overprinting" process information prints a black character upon a background.

Various control processings that are executed by the CPU 10 are described hereinafter in detail.

Figure 2:
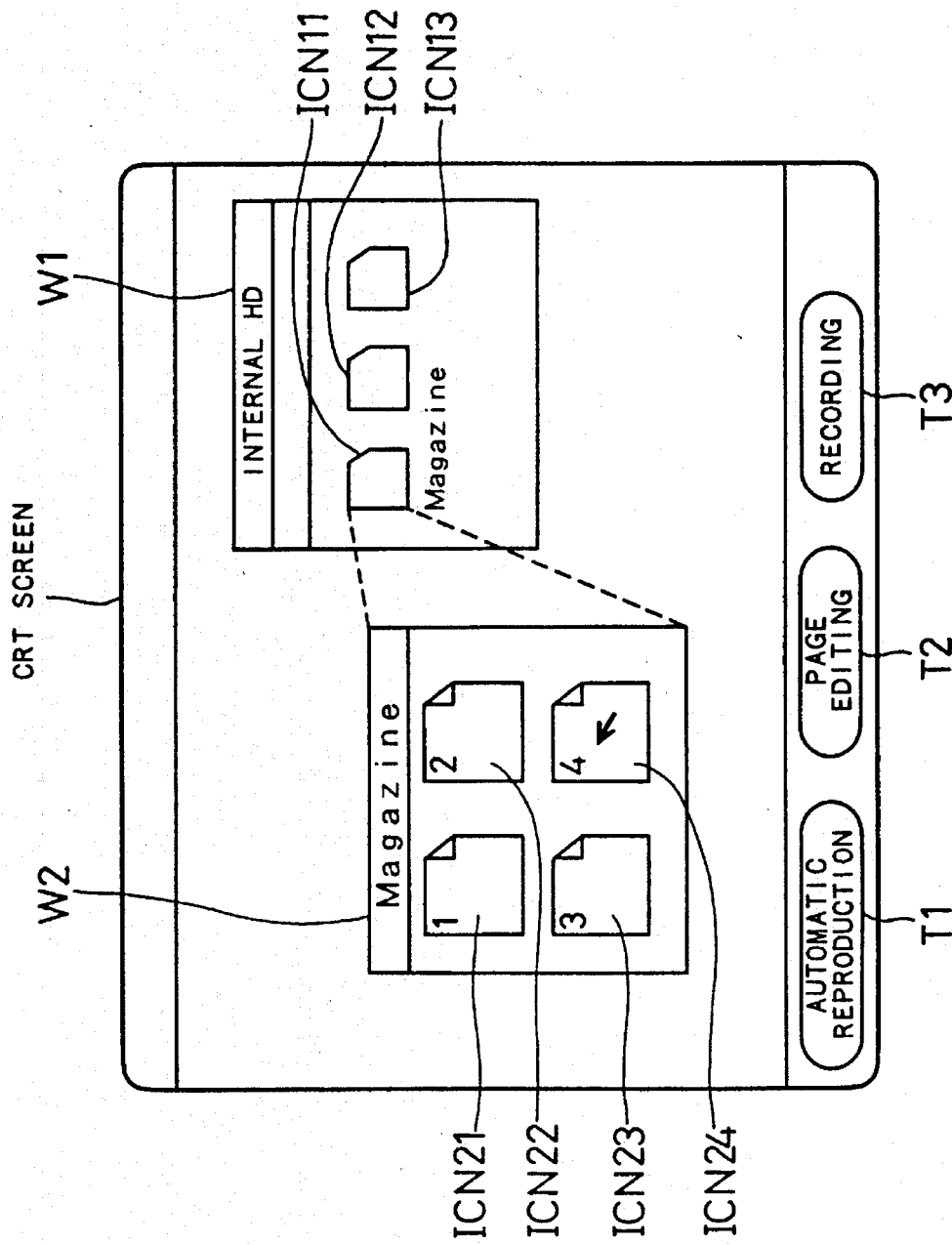
FIG. 2 shows an example of a display on a CRT screen prior to the execution of an automatic reproduction process.

As shown in FIG. 2, a first window W1, which shows the contents of the internal hard disk unit 18, and a second window W2, which shows the contents of the page data Dp designated as 'Magazine' in the internal hard disk unit 18, are opened on the screen of the color CRT display 24 (hereinafter referred to as the CRT screen).

The operator clicks the mouse 22 so as to select an icon of a desired page out of the first through fourth icons ICN21 through ICN24, in accordance with the first through fourth pages, in the second window W2, and draws the selected icon to a desired process title, e.g., T1 "Automatic Reproduction", T2 "Page Editing", or T3 "Recording", which are displayed in a process title bar that is arranged at the bottom of the CRT screen. The CPU 10 then starts processing, in accordance with the selected process title T1, T2, or T3, the images in the selected page image. For example, when the operator selects the fourth icon ICN24, corresponding to the fourth page in the second window W2, and draws the selected icon ICN24 to the process title T1, which represents "Automatic Reproduction", the CPU 10 then executes the automatic reproduction process so as to automatically select specific process information for the images in the fourth page. The automatic reproduction process, which is executed by the CPU 10, is now described according to the flowcharts of FIGS. 3 and 4.

Figure 3:
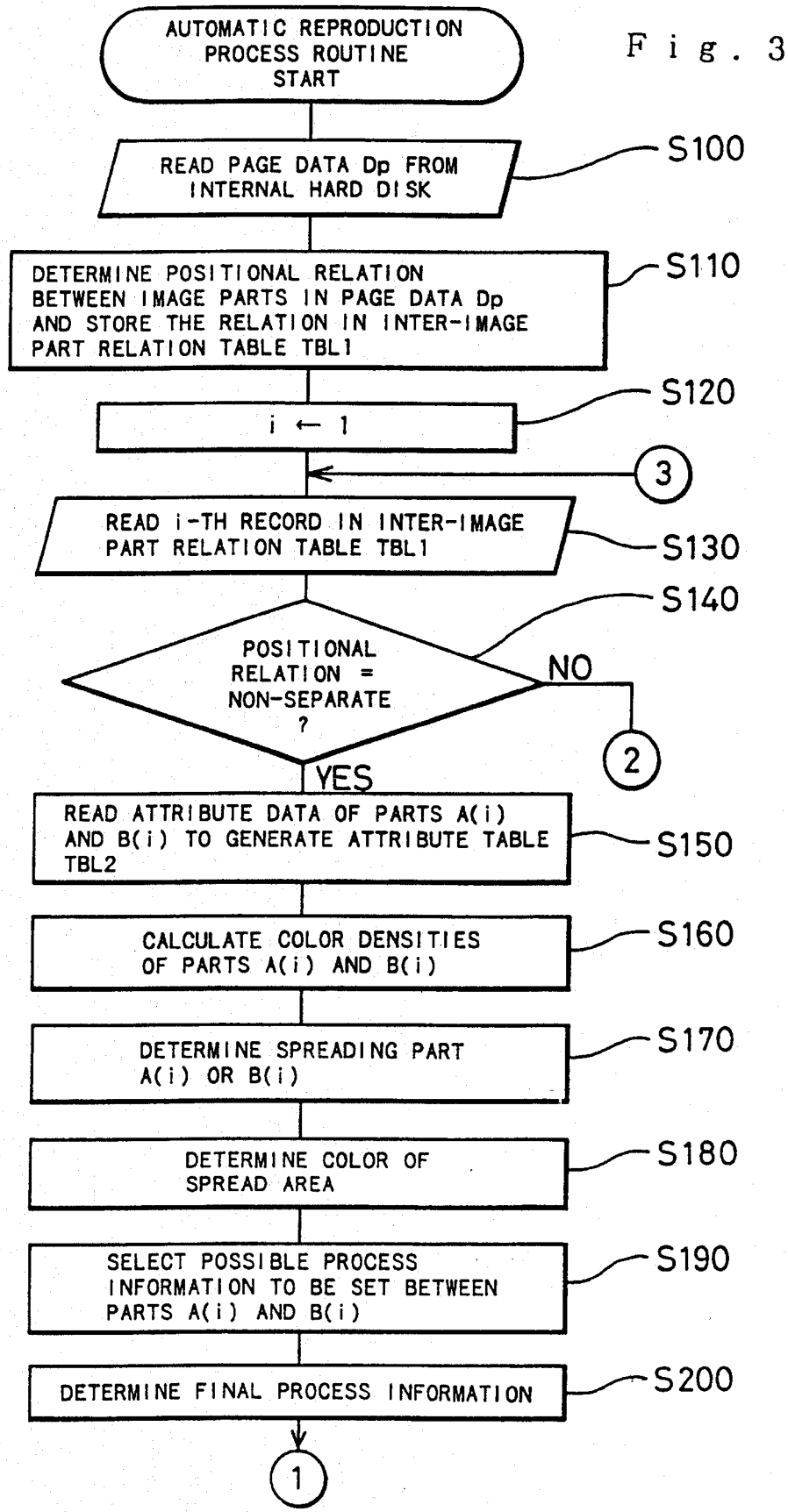
FIGS. 3 and 4 are flowcharts showing an automatic reproduction process routine executed by the CPU 10.

At the start of the routine shown in FIG. 3, at step S100 the CPU 10 reads page data Dp, which corresponds to the selected page image (in this example the fourth page) that was drawn to the desired process title T1 at the bottom of the CRT screen, out of the internal hard disk unit 18 and writes the page data Dp into the RAM 16. At step S110, the CPU 10 determines positional relation between each of the plurality of image parts in the page image, and stores the results of the determination in an inter-image part relation table TBL1.

More specifically, the positional relation represents the relative positions of two image parts in the plurality of image parts in the page image. Such positional relations include "Overlapping" "Including", "Identical", "Contact", and "Separate". FIG. 5 shows examples of such positional relations between two image parts: "Overlapping" in FIG. 5A, "Including" in FIG. 5B, "Identical" in FIG. 5C, "Contact" in FIG. 5D, and "Separate" in FIG. 5E.

At step S110, the CPU 10 successively reads two sets of figure data, which correspond to any two of the image parts in the page data Dp. The CPU 10 then calculates an intersection of the two sets of figure data using an algorithm like Bentley-Ottmann's overlap enumeration (J. L. Bentley and T. A. Ottmann: "Algorithms for reporting and counting geometric intersections", IEEE Transactions on Computers Vol.C-28, No. 9, pp. 643–647 (1979)), and determines a positional relation between the two sets of figure data based on the intersection. The positional relation thus determined is stored in the inter-image part relation table TBL1. The CPU 10 repeats this process for all possible combinations of two image parts in the plurality of image parts.

Figure 6:
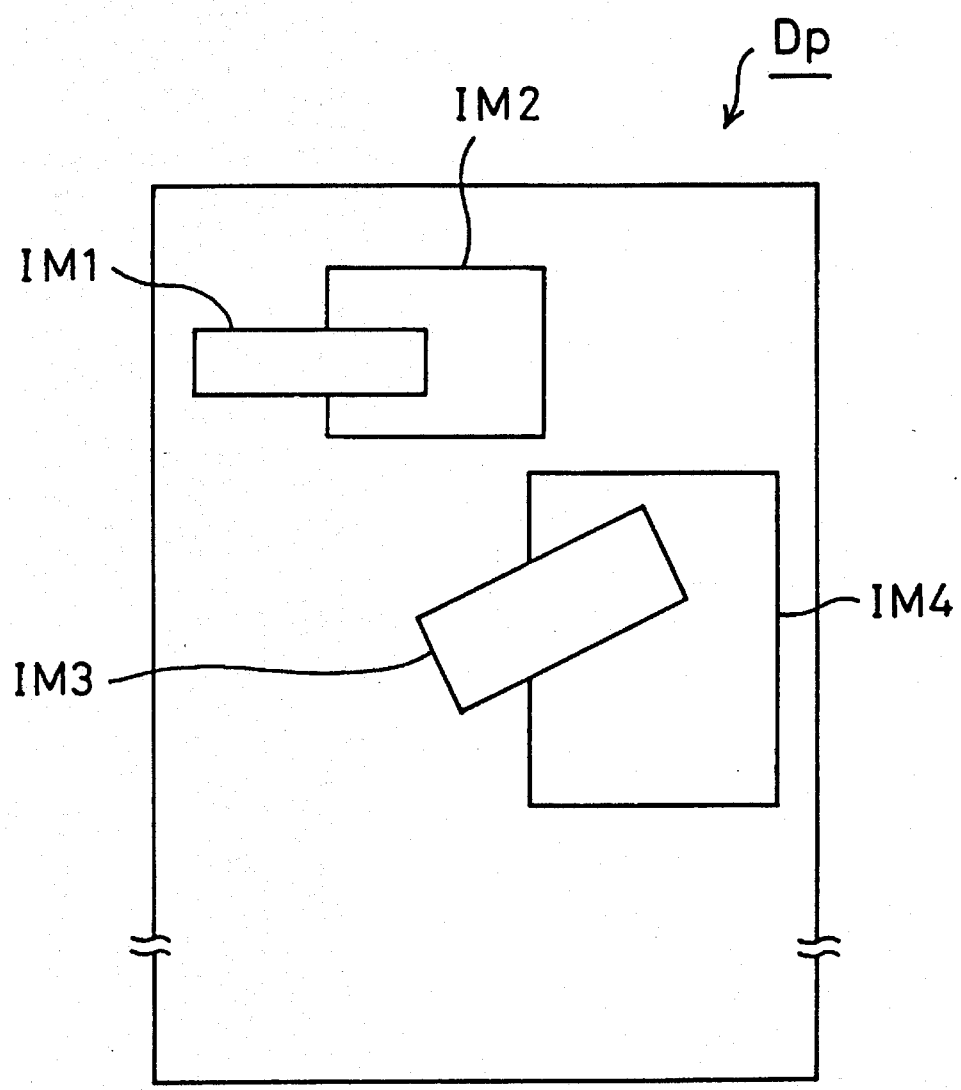
FIG. 6 shows an example of page data Dp.

Details of the processing at step S110 are further explained based on FIG. 6, which shows an example of page data Dp including the first through the fourth image parts IM1 through IM4. In the example of FIG. 6, the second image part IM2 lies under the first image part IM1 while the fourth image part IM4 lies under the third image part IM3. At step S110, the CPU 10 reads in succession two sets of figure data for any two of the image parts in the page data Dp. For example, the data for the first and second image parts IM1 and IM2 is read, followed by the data for another pair of figures corresponding to the second and third image parts IM2 and IM3, and so on for all possible combinations of two image parts. The CPU 10 then determines the positional relation between the figure data of the respective two image parts read together according to the method mentioned above, and stores the results of the determination in the inter-image part relation table TBL1.

FIG. 7 shows the inter-image part relation table TBL1 corresponding to the page data Dp shown in the example of FIG. 6. The inter-image part relation table TBL1 has a plurality of records (1 through N), each including the positional relation between two image parts as well as addresses that represent the positions of the two image parts stored on the RAM 16. In FIG. 7, one of the two image parts is designated as part A and the other as part B.

The program then goes to step S120 at which a variable $i$ ($i=1, 2, \ldots, N$) is initialized to the value "1". After step S130, at which the CPU 10 reads an i-th record in the inter-image part relation table TBL1 on the RAM 16, the program proceeds to step S140 at which it is determined whether the positional relation stored in the i-th record is a positional relation other than "Separate". When the positional relation is determined not to be equal to "Separate" at step S140, that is, when the two image parts A(i) and B(i) in the i-th record are in a relation with each such as "Overlapping", "Including", "Identical", or "Contact", the CPU 10 executes the processing of steps S150 through S210.

At step S150, the CPU 10 reads the attribute data of the parts A(i) and B(i) out of the RAM 16 according to the addresses stored in the i-th record, which were read at step S130, and generates an attribute table TBL2, which includes the attribute data of the two parts A(i) and B(i).

The attribute data of the image parts represent the type of each image part, e.g., picture, character, or tint, and color of the image part, which is expressed as dot percents of the color plates Y (yellow), M (magenta), C (cyan), and K (black). As shown in FIG. 8, the attribute table TBL2 includes the types and colors of the image parts A(i) and B(i) as well as the vertical relative positions of the overlapped image parts A(i) and B(i). The vertical relative positions of the image parts A(i) and B(i) are determined according to the addresses of the image parts A(i) and B(i) on the RAM 16, where a smaller address represents a lower relative position. At step S150, the CPU 10 determines the vertical relative positions of the two image parts A(i) and B(i) according to the addresses thereof, and writes the attribute data and the vertical relative positions of the two image parts A(i) and B(i) in the attribute table TBL2. The program then goes to step S160 at which the CPU 10 calculates the color densities of the image parts A(i) and B(i) through data exchange with rule base RB stored in the external hard disk unit 32. The color density is determined by giving respective weights to the dot percents of the color plates Y, M, C, and K stored in the attribute table TBL2, and is expressed as:

$$\text{Color Density } CD = aRY + bRM + cRC + dRK \qquad (1)$$

where RY, RM, RC, and RK, respectively, denote dot percents of the color plates Y, M, C, and K, and a, b, c, and d are constants meeting the relationship $a<b<c<d$. In this example, a, b, c, and d are set equal to 0.1, 0.2, 0.3, and 0.4, respectively.

The rule base RB includes a production rule having an action part. The action part calculates the color densities when a condition part of the production rule for proceeding to calculate the color densities is satisfied. The CPU 10 applies the production rule according to the so-called forward reasoning. Forward reasoning is one of the known knowledge-based reasoning, also known as "bottom-up search/reasoning" or "data driven reasoning". Such methodology is well known in the art and, therefore, will not be described in detail here.

The CPU 10 in step S160 determines the color densities of the image parts A(i) and B(i) through data exchange with rule base RB. In other words, through data exchange between the CPU 10 and rule base RB, if the condition part of the production rule for proceeding to calculate the color densities is satisfied, the action part which calculates the color densities is applied. Once the action part is applied, the CPU 10 sends the data corresponding to the values of RY, RM, RC, and RK, respectively, to rule base RB, and rule base RB sends back to the CPU 10 data corresponding to the color densities calculated according to the above equation (1). The CPU 10 then executes the processing of the subsequent steps S170 through S200 through data exchange with rule base RB. The CPU 10 applies the forward reasoning mentioned above to exchange data with rule base RB.

At step S170, through data exchange with rule base RB, the CPU 10 selects an image part that is to be spread out of the two image parts A(i) and B(i), and stores the name or address of the selected image part. As is well known to persons skilled in the art, in a printing process it is sometimes desirable to spread the area of an image part that is to be printed. For example, when an image part, such as a letter, is overlapped with another image part, such as a picture, it is sometimes necessary to spread the area of the overlapping portions, thereby generating a spread area. This process is generally referred to as the "Trapping" process and effectively prevents a "drop-out" between the two adjacent overlapped image parts in printing.

The portion that is to be spread, i.e., the "spreading part", could be a part of the first image part or a part of the second image part. As discussed in further detail below, at step S170 the CPU 10 generates a "spread area" between the two image parts A(i) and B(i) based on the color densities of the parts A(i) and B(i), which were calculated at step S160, as well as the types of the image parts A(i) and B(i), which are stored in the attribute table TBL2.

As discussed above, the spreading part represents a portion of an image part that is spread in accordance with the process information that is selected for the two image parts. The spreading part is determined based upon the name or address of the image part selected and stored, as described above. The spreading part shows which image part should be spread for a specific process information selected, for example, "Trapping" or "Overprint".

The selected process information is stored in the system memory between the two image parts, to which it is to be applied during printing. As is generally known, the system stores the selected process information in memory along with the name or address of the first image part and the name or address of the second image part. Accordingly, during printing the contents of the memory then instruct the system that the selected process information is to be executed with the printing of the first image part and the second image part.

Figure 9A:
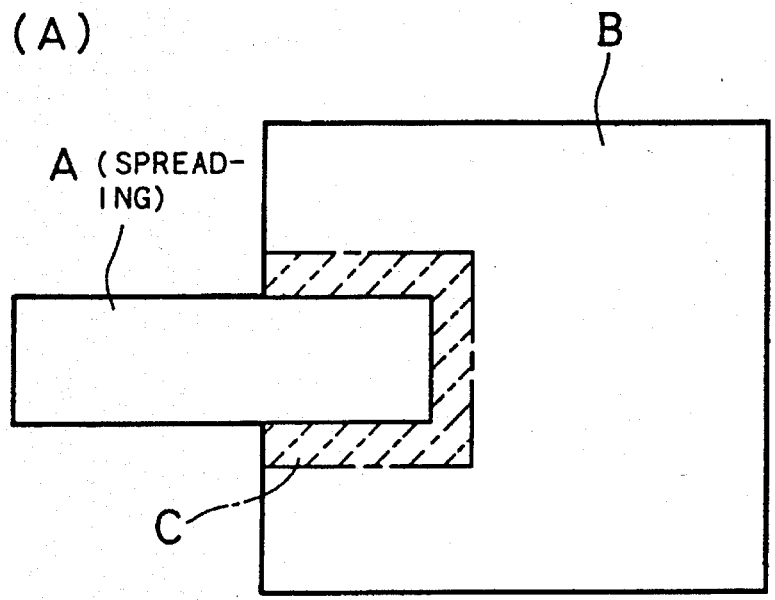
FIGS. 9A and 9B show a spreading part selected out of two image parts.
Figure 9B:
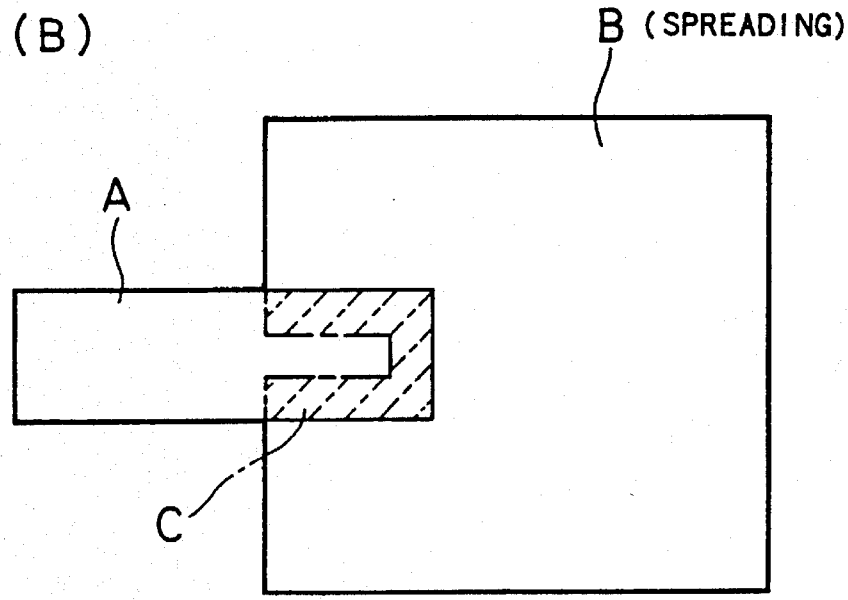

In an example that is shown in FIGS. 9(A) and (B), a part A lies over another part B, and a specific process information "Trapping" is selected for printing with the two parts A and B. When an overlapping area C is formed in a "U"-shape around a part of the contour of the part A, as shown in FIG. 9A, the spreading part is selected as the part A. In contrast, when the overlaying area C is formed in a "U"-shape around a part of the contour of the part B, as shown in FIG. 9B, the spreading part is selected as the part B.

Since the spreading part is determined according to the image types of parts A and B, as well as their color densities, rule base RB has a rule previously stored therein. This rule includes types and color densities of the image parts as a condition part, and a spreading part as an action part. At step S170, the CPU 10 determines the spreading part and generates a spread area according to the rule stored in rule base RB. An example of the rule stored in rule base RB is given as:

(1) When the image parts A and B are a combination of a picture part and a tint part, the tint part is to be spread;

(2) When the image parts A and B are a combination of a picture part and a character part, the picture part is to be spread;

(3) When the image parts A and B are a combination of a tint part and a character part, the tint part is to be spread; and (4) When both the image parts A and B are tint parts, the image part having the smaller color density, as calculated at step S160, is to be spread.

At step S180, through data exchange with rule base RB, the CPU 10 determines the color of the spread area formed between the two parts A(i) and B(i), based on the colors of the parts A(i) and B(i). Dot percents RYA through RKA of the Y, M, C, and K color plates, representing the color of the part A(i), are respectively compared with the dot percents RYB through RKB, representing the color of the part B(i). The larger value is determined as a dot percent for each color plate in the spread area. When the values are equal to each other, either value may be designated as a dot percent in the spread area.

In the example of the image parts A(i) and B(i), shown in the attribute table TBL2 of FIG. 8, both the Y dot percents RYA and RYB of the image parts A(i) and B(i), respectively, are equal to zero(%), and the value "0(%)" is set as a Y dot percent of the spread area. The M dot percents RMA and RMB are respectively equal to 50(%) and 10(%), and the larger value "50(%)" is set as an M dot percent of the spread area. On the other hand, the C dot percents RCA and RCB are respectively equal to 10(%) and 50(%), and the larger value "(50(%)" is set as a C dot percent of the spread area. Both the K dot percents RKA and RKB are equal to zero(%), and the value "0(%)" is set as a K dot percent of the spread area. Accordingly, the color of the spread area is expressed as Y, M, C, and K dot percents=(0, 50, 50, 0).

The rule base RB has such a rule, previously stored therein, for determining the color of the spread area. At step S180, the CPU 10 determines the color of the spread area according to the rule stored in the rule base RB.

At step S190, through data exchange with rule base RB, the CPU 10 selects prepress process information to execute between the image parts A(i) and B(i). The CPU 10 could select one or a plurality of prepress process information. The selection of prepress process information is implemented according to the vertical relative positions, the types, and the colors or the color densities based thereon, of the image parts A and B stored in the attribute table TBL2. As discussed above, rule base RB has a rule previously stored therein, which includes the data stated above as the condition part and prepress process information as an action part.

At step S190, the CPU 10 selects prepress process information according to the rule stored in rule base RB.

An example of the rule stored in rule base RB is given as:

(1) Condition Part

The part located above (hereinafter referred to as the "upper part") is a tint;

The part located below (hereinafter referred to as the "lower part") is a tint;

Any color plate representing the color of the lower part has a dot percent greater than a predetermined value (for example, 30(%));

Any color plate representing the color of the upper part has a dot percent greater than a predetermined value (for example, 30(%)); and The color density of the upper part is smaller than the color density of the lower part.

Action Part

When all the above conditions are fulfilled, the prepress process information selected is "Trapping".

(2) Condition Part

The upper part is a character;

The K dot percent of the upper part is equal to 100(%); and

The lower part is a picture.

Action Part

When all the above conditions are fulfilled, the prepress process information selected is "Outline".

(3) Condition Part

The upper part is a character;

The Y dot percent of the upper part is equal to zero(%);

The M dot percent of the upper part is equal to zero(%);

The C dot percent of the upper part is equal to zero(%);

The K dot percent of the upper part is equal to 100(%); and

Any color plate of the lower part has a dot percent greater than zero(%).

Action Part

When all the above conditions are fulfilled, the prepress process information selected is "Overprinting".

After the CPU 10 selects prepress process information at step S190, the program proceeds to step S200 at which the CPU 10 selects only one process title for a specific prepress process information out of the plurality of prepress process information selected at steps S190. The selection of one process title at step S200 is based on predetermined process information priority and this selection determines the selected title as the final prepress process information. The prepress process titles "Overprinting" "Outline" and "Trapping" have priority in this order. Namely, the process information "Overprinting" has first priority. For example, when the process titles "Trapping" and "Outline" are selected as prepress process information at step S190, the CPU 10 selects the process title "Outline" with the higher priority as the final prepress process information at step S200. Selection of the final process information is also implemented according to such a rule stored in rule base RB.

Figure 4:
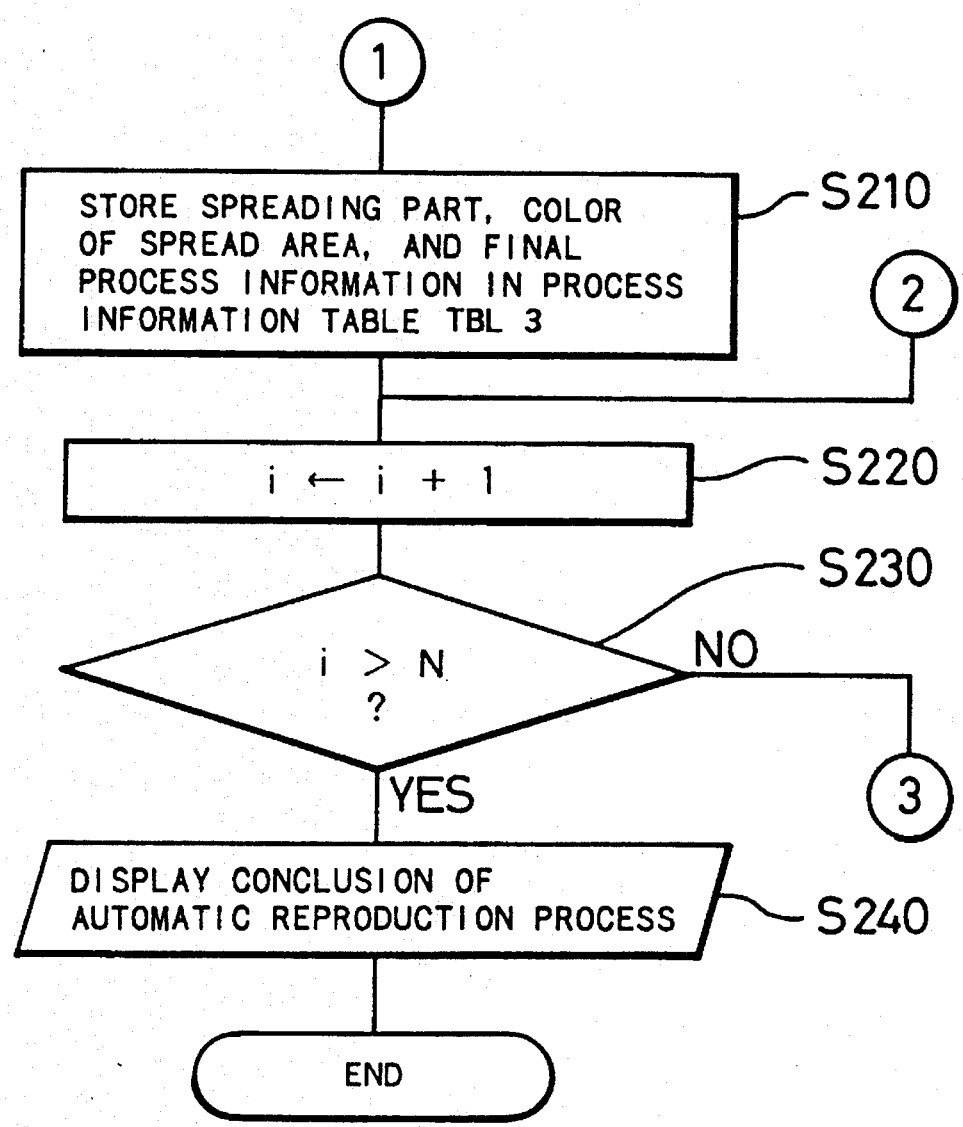

The program then goes to step S210, shown in the flowchart of FIG. 4, at which the CPU 10 stores the spreading part, which was determined at step S170, the color of the spread area, which was determined at step S180, and the final process information, which was determined at step S200 in a process information table TBL3 on the RAM 16. More specifically, the CPU 10 reads the addresses of the image parts A(i) and B(i) out of the inter-image part relation table TBL1 on the RAM 16, and stores the addresses, the spreading part, the color of the spread area, and the final process information on the RAM 16 as the process information table TBL3, as shown in FIG. 10.

The program then goes to step S220, at which the variable i is incremented by one. At step S230, the variable i is compared with the number of stored records N in the inter-image part relation table TBL1. When the variable i is greater than N, the program goes to step S240, at which the CPU 10 determines that the automatic reproduction process has been completed for all the records stored in the inter-image part relation table TBL1, and generates a display on the color CRT display 24 representing the conclusion of the automatic reproduction process. This concludes the automatic reproduction process for automatically selecting prepress process information for image parts in the page image.

Such a display of the results of the automatic reproduction process may be located on any part of the CRT screen; for example, in this embodiment, immediately above the selected icon in the second window W2, shown in FIG. 2. After execution of step S240, the program exits from the routine.

When the variable i is equal to or smaller than N at step S230, the program returns to step S130 and repeats the process of step S130 and the subsequent steps so as to execute processing for a next record in the inter-image part relation table TBL1.

When the positional relation between the two image parts stored in the i-th record of the inter-image part relation table TBL1 is determined to be equal to "Separate" at step S140, the program proceeds to step S220 and does not select any process information for the image parts that are in the "Separate" relationship.

According to the automatic reproduction process routine described above, specific process information is automatically selected for printing with the page image. In the automatic reproduction process routine of FIGS. 3 and 4, the steps S110 and S140 function as the positional relation discriminating element 10a, and steps S160 through S200 function as the process information determining element 10b.

Figure 11:
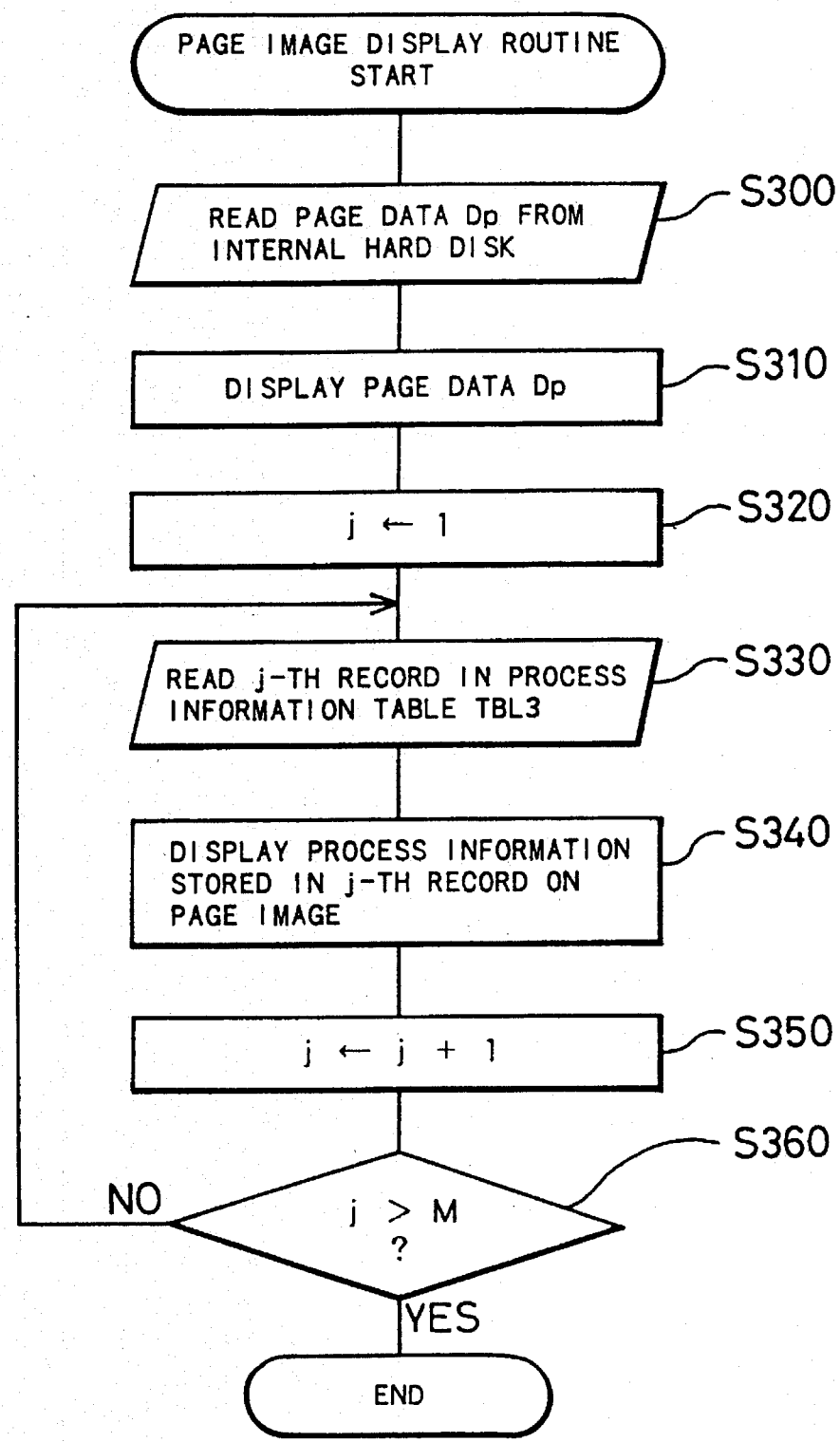
FIG. 11 is a flowchart showing a page image display routine executed by the CPU 10.

After completion of the automatic reproduction process described above, the operator clicks the mouse 22 to select one of the first through fourth icons ICN21, ICN22, ICN23, or ICN24 corresponding to a desired page, for which the process information has previously been automatically selected according to the above routine and displayed in the second window W2 on the CRT screen shown in FIG. 2. The operator draws the selected icon to the process title T2 "Page Editing". The CPU 10 then executes processing for displaying an image of the selected page on the CRT screen. FIG. 11 is a flowchart showing a page image display routine executed by the CPU 10.

At the start of the routine in FIG. 11, at step S300 the CPU 10 reads page data Dp, corresponding to the selected page drawn down to the process title T2 on the CRT screen, out of the internal hard disk unit 18 and writes the page data Dp into the RAM 16. The CPU 10 then outputs the page data Dp to the display controller 26 so as to display an image corresponding to the page data Dp on the color CRT display 24 at step S310.

After a variable j (j=1,2, . . . ,M) is initialized to the value '1' at step S320, the program goes to step S330 at which the CPU 10 reads a j-th record in the process information table TBL3 on the RAM 16. At step S340, specific process information stored in the j-th record is shown on the image corresponding to the page data Dp displayed at step S310.

Figure 12:
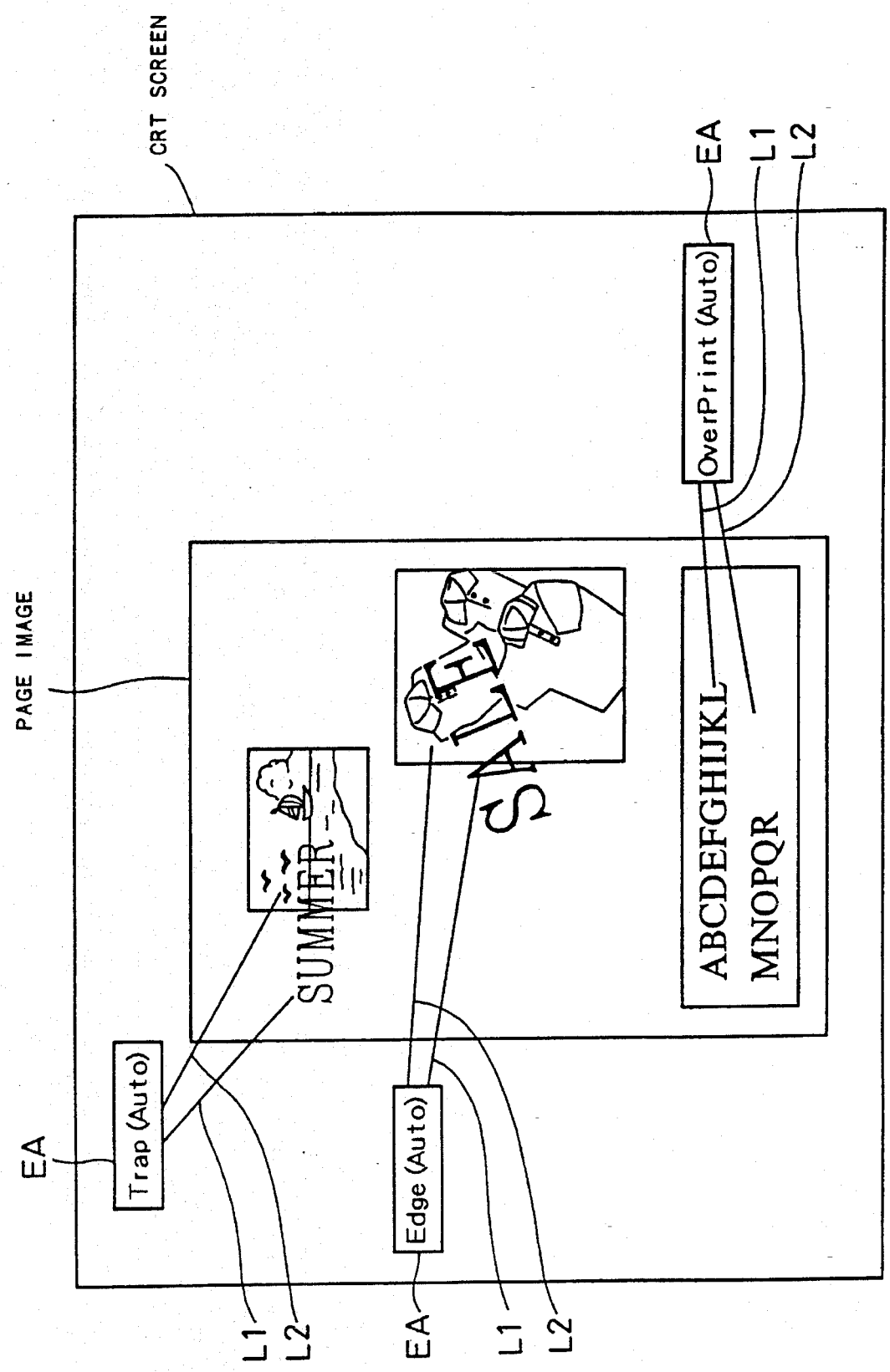
FIG. 12 shows an exemplified page image displayed through execution of the page image display routine of FIG. 11.

More specifically, the CPU 10 reads addresses of the image parts A and B stored in the j-th record of the process information table TBL3 and selects the two target image parts corresponding to the selected process information based on the addresses. As shown in FIG. 12, the CPU 10 then draws process information display box EA at arbitrarily selected places in the vicinity of the two target image parts on the CRT screen, and writes in the boxes EA the specific process information stored in the j-th record of the process information table TBL3. The CPU 10 further draws segments L1 and L2, respectively, connecting the display boxes EA with the target image parts.

The operator can move the display boxes EA to any desired position on the CRT screen with the mouse 22. In this embodiment, a process title "Trap(Auto)" is written in the display box EA when the specific process information in the j-th record is "Trapping"; "Edge(Auto)" for the "Outline" process information and "Overprint(Auto)" for the "Overprinting" process information are written in display boxes EA in a similar way. The display "(Auto)" shows that the process information was selected automatically by the automatic reproduction process routine described above.

After execution of step S340, the variable j is incremented by one at step S350. The program then proceeds to step S360 at which the variable j is compared with the number of records M stored in the process information table TBL3. When the variable j is greater than M, the CPU 10 determines that the display of target areas for which process information has been selected is completed for all the records stored in the process information table TBL3, and the program exits from the routine. When the variable j is equal to or smaller than M at step S360, the program returns to step S330 and repeats the execution of the step S330 and the subsequent steps for processing the next record in the process information table TBL3.

The page image is displayed together with the selected process information on the CRT screen according to the page image display routine described above. The operator then compares the display on the CRT screen, including the specific process information automatically selected and stored according to the automatic reproduction process routine, with a specification of the reproduction instructions. Upon finding some discrepancy or inconsistency, the operator corrects the selected process information by a conventional method of manually selecting and storing prepress process information.

Figure 13:
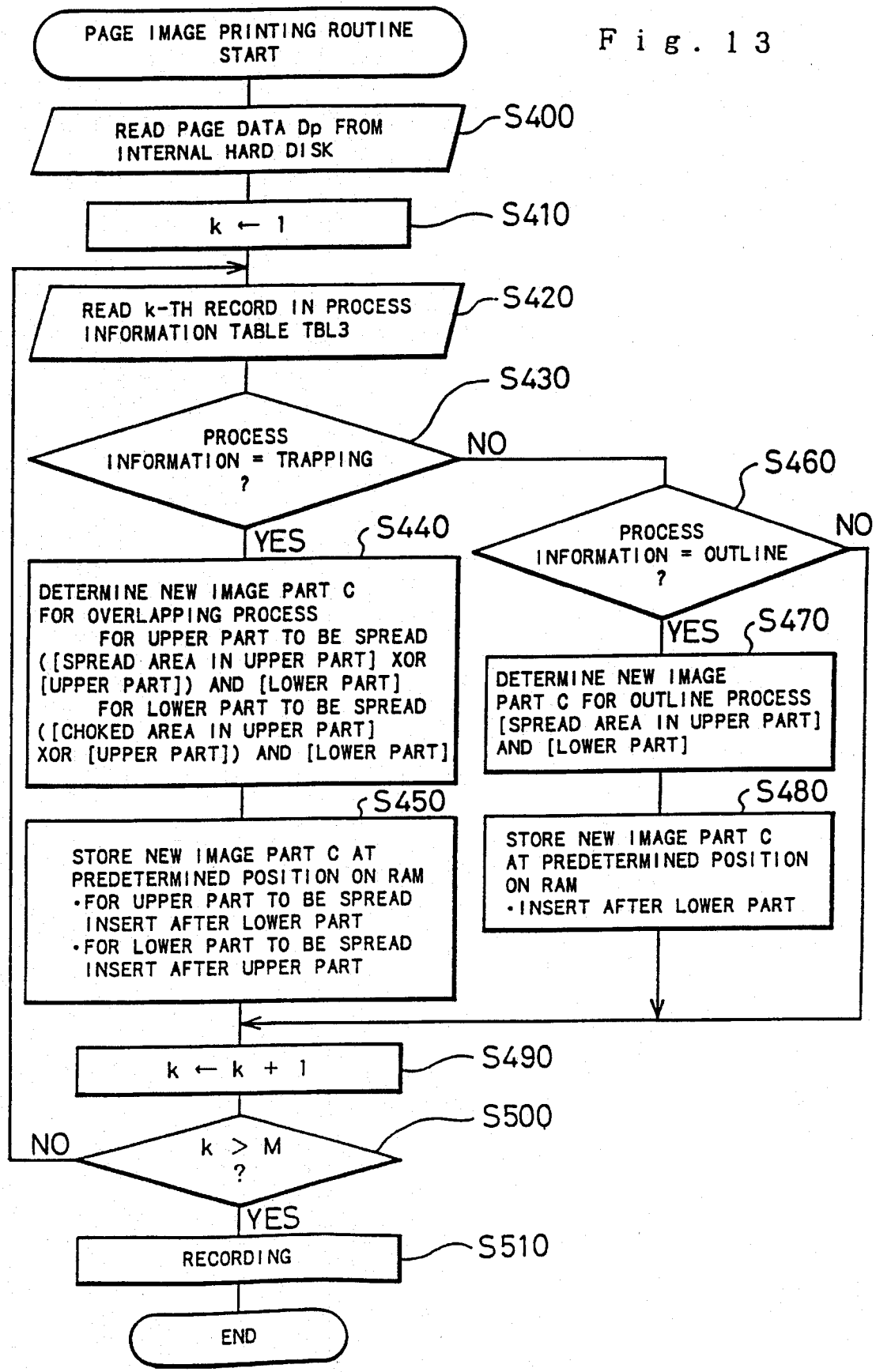
FIG. 13 is a flowchart showing a page image recording routine executed by the CPU 10.

After completion of the page image display process described above, the operator clicks the mouse 22 to select another one of the first through fourth icons ICN21, ICN22, ICN23, or ICN24, displayed in the second window W2 on the CRT screen shown in FIG. 2, corresponding to a desired page, for which the selected process information has been displayed in the page image according to the above routine. The operator draws the selected icon to the process title T3 "Recording". The CPU 10 then executes processing for recording an image of the selected page onto a photosensitive film or the like with the image recording unit 28. FIG. 13 is a flowchart showing a page image printing routine executed by the CPU 10.

At the start of the routine shown in FIG. 13, at step S400 the CPU 10 reads page data Dp corresponding to the selected page drawn to the process title T3 on the CRT screen, out of the internal hard disk unit 18 and writes the page data Dp into the RAM 16.

After a variable k (k=1,2, . . . ,M) is initialized to the value "1" at step S410, the program goes to step S420 at which the CPU 10 reads a k-th record in the process information table TBL3 on the RAM 16. At step S430, it is determined whether the process information stored in the k-th record is "Trapping". When the answer is YES at step S430, the program goes to step S440 at which a new image part C representing an overlapping area between the respective target image parts of the "Trapping" process is determined.

The new image part C, determined at step S440, differs according to the spreading part, i.e. which of is to be spread. When it is determined that the upper part is to be spread based on attribute data stored in the k-th record of the process information table TBL3, the upper part (for example, part A) is spread so as to generate a new image part C, as shown in FIG. 9A. When it is determined that the lower part is to be spread based on attribute data stored in the k-th record of the process information table TBL3, the lower part (for example, part B) is spread so as to generate a new image part C, as shown in FIG. 9B.

When the upper part is to be spread as shown in FIG. 9A, the new image part C is generated according to a logic operation expressed as:

$$([\text{Spread Area in Upper Part}] \text{ XOR } [\text{Upper Part}]) \text{ AND } [\text{Lower Part}] \quad (2)$$

In a first step, a spread area (spread upper part) is generated by spreading the upper part.

In a second step, after the calculation of an exclusive logical sum XOR of the spread area and the original (non-spreading) upper part, a logical product (AND) of the exclusive logical sum and the lower part is designated as the new image part C.

When the lower part is to be spread as shown in FIG. 9B, the new image part C is generated according to a logic operation expressed as:

$$([\text{Choked Area in Upper Part}] \text{ XOR } [\text{Upper Part}]) \text{ AND } [\text{Lower Part}] \quad (3)$$

In a first step, a choked area (choked upper part) is determined by choking the upper part. The term "choking" refers to narrowing or reducing an area of an image part. Accordingly, "a choking part" is the opposite to "a spreading part", previously discussed above. For example, in FIG. 9A, the image part C is "a spreading part" with respect to the image part A and, in FIG. 9B, the image part C is "a choking part" with respect to the image part A. In a second step, after the calculation of an exclusive logical sum XOR of the choked area and the original (non-choking) upper part, a logical product (AND) of the exclusive logical sum and the lower part is designated as the new image part C.

Figure 14:
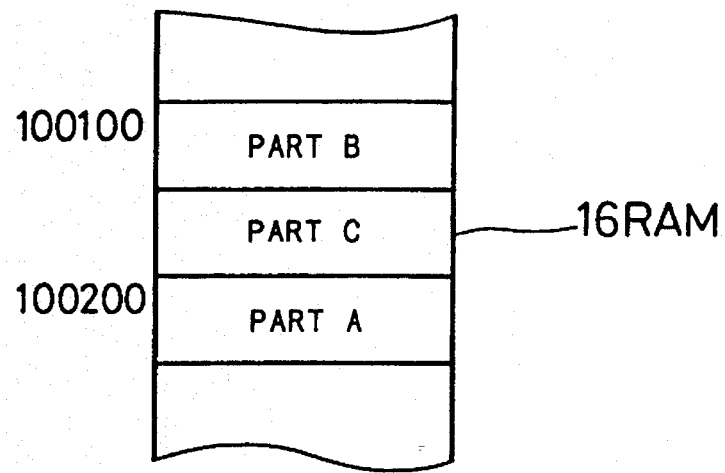
FIG. 14 shows an example of a position of a new image part generated by the 'Trapping' process stored on the RAM 16.

After the determination of the new image part C at step S440, the program goes to step S450 at which the new image part C is stored at a predetermined position on the RAM 16. The predetermined position denotes a location immediately after an address of the lower part on the RAM 16 when the upper part is to be spread as, shown in FIG. 9A. In the relation stored in the first record of the process information table TBL3, shown in FIG. 10, for example, the part A is stored after the part B, as shown in FIG. 14. The new image part C determined through the above process is then inserted between the part B and the part A.

Figure 15:
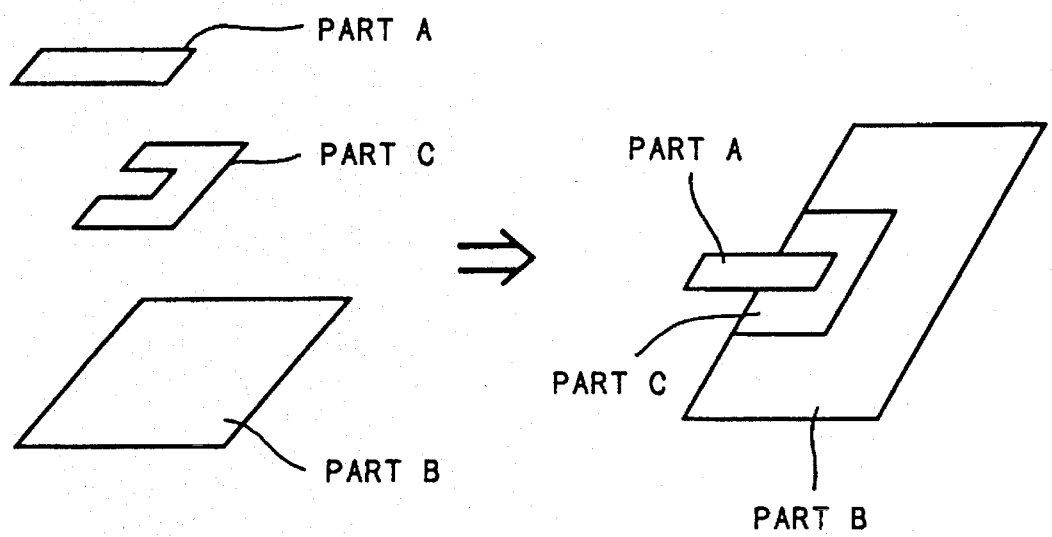
FIG. 15 shows vertical relative positions, in printing, of the image parts stored on the RAM 16 as shown in FIG. 14.

The storing sequence on the RAM 16 shows the vertical relative positions of the image parts at the time of image recording (described later). An image part with a lower number in the storing sequence is registered at the lower address. In the example of FIG. 9A, the part B, the part C, and the part A each have lower number in the storing sequence in this order, and thereby have vertical relative positions so as to be laid one upon another in this order for printing, as shown in FIG. 15. At step S450, the CPU 10 also inputs the color of the spread area according to the attribute data of the k-th record in the process information table TBL3, and stores the color as the color data of the image part C on the RAM 16.

Figure 16:
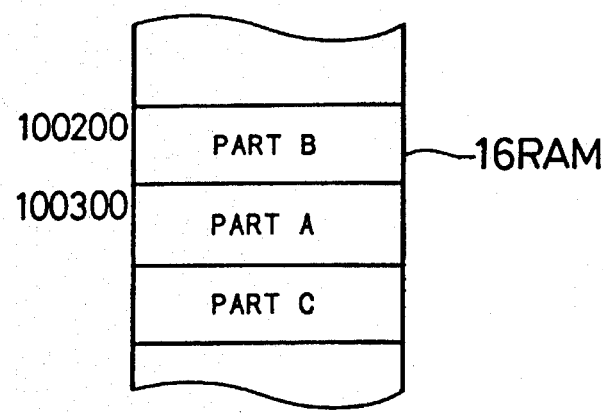
FIG. 16 shows another example of a position of a new image part C generated by the 'Trapping' process stored on the RAM 16.
Figure 17:
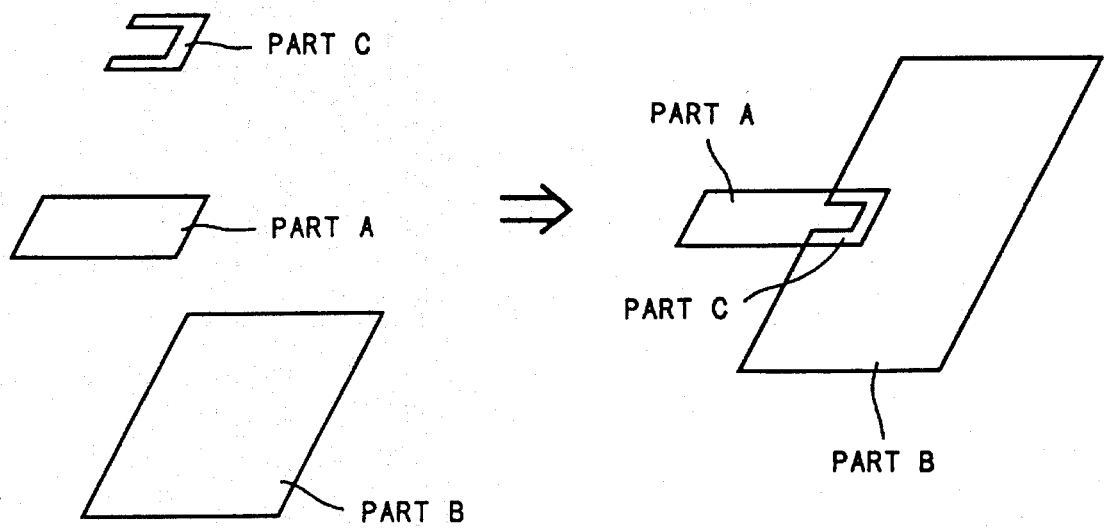
FIG. 17 shows vertical relative positions, in printing, of the image parts stored on the RAM 16 as shown in FIG. 16.

When the lower part is to be spread as shown in FIG. 9B, on the other hand, the image part C is stored immediately after the upper part on the RAM 16. In the relation stored in the second record of the process information table TBL3, shown in FIG. 10, for example, the part A is stored after the part B, as shown in FIG. 16. The image part C, determined through the above process, is then inserted after the part A. The part B, the part A, and the part C each have a lower number in the storing sequence in this order, and thereby have the vertical relative positions so as to be laid one upon another in this order for printing, as shown in FIG. 17.

When the process information is determined not to be equal to "Trapping" at step S430, the program goes to step S460 at which it is determined whether the process information is "Outline". When the answer is YES at step S460, the program goes to step S470 at which a new image part C representing an outlined area between the target image parts of the "Outline" process is determined. The image part C is determined according to a logic operation expressed as:

[Spread Area in Upper Part]AND [Lower Part]  (4)

In a first step, a spread area (spread upper part) is generated by spreading the upper part. In a second step, a logical product (AND) of the spread area and the lower part is designated as the new image part C.

Figure 18:
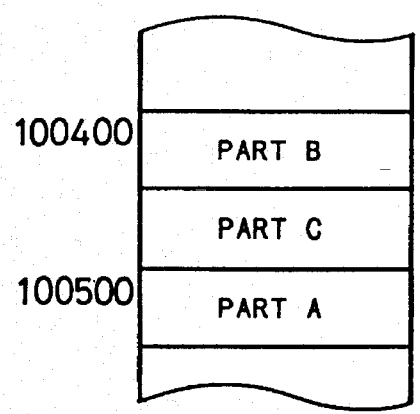
FIG. 18 shows yet another example of a position of a new image part C generated by the 'Outline' process stored on the RAM 16.
Figure 19:
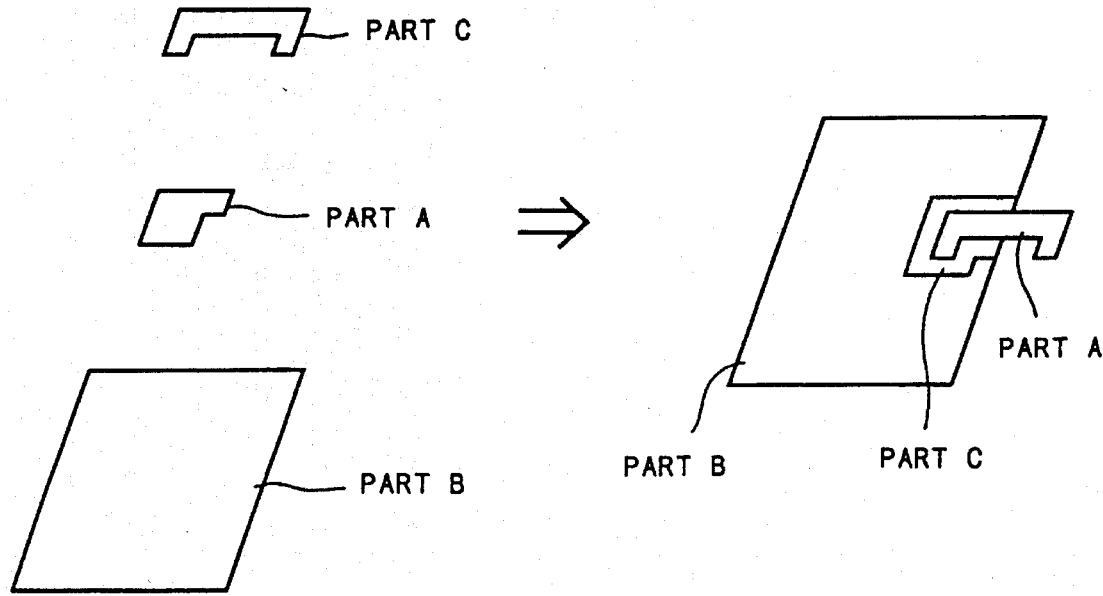
FIG. 19 shows vertical relative positions, in printing, of the image parts stored on the RAM 16 as shown in FIG. 18.

The program then proceeds to step S480 at which the new image part C thus obtained is stored at a predetermined position on the RAM 16. In the relation stored in the third record of the process information table TBL3, shown in FIG. 10, for example, the part A is stored after the part B, as shown in FIG. 18. The new image part C determined through the above process is then inserted between the part B and the part A. The part B, the part C, and the part A each have a lower number in the storing sequence in this order, and thereby have the vertical relative positions so as to be laid one upon another in this order for printing, as shown in FIG. 19. At step S480, the CPU 10 also inputs the color of the spread area according to the attribute data of the k-th record in the process information table TBL3, and stores the color as color data of the new image part C on the RAM 16.

After execution of step S450 or S480, or when the selected process information is determined not to be equal to "Outline" at step S460, the program goes to step S490 at which the variable k is incremented by one. When the selected process information is neither "Trapping" nor "Outline" but is equal to "Overprinting" the program goes to step S490 since generation of a new image part C is not required.

At step S500, the variable k is compared with the number of records M stored in the process information table TBL3. When the variable k is greater than M, the CPU 10 determines that the generation of the new image part C (except in "Overprinting") has been completed for all the records stored in the process information table TBL3, and the program goes to step S510. When the variable k is equal to or smaller than M at step S500 the program returns to step S420 and repeats execution of the step S420 and the subsequent steps so as to generate an image part C between image parts of a next record in the process information table TBL3.

At step S510, the CPU 10 successively reads image data or mask data representing a plurality of image parts generated through execution of the steps to S500 and stored on the RAM 16, and executes raster expansion of the image data by one or a plurality of lines in a primary scanning direction of the image recording unit 28 so as to generate output instruction data. The CPU 10 then composes tint data and picture data, which were previously stored, according to the output instruction data, and outputs the composed data to the image recording unit 28 so as to record an image of a page including the plurality of image parts on a recording medium such as a photosensitive film.

Figure 20:
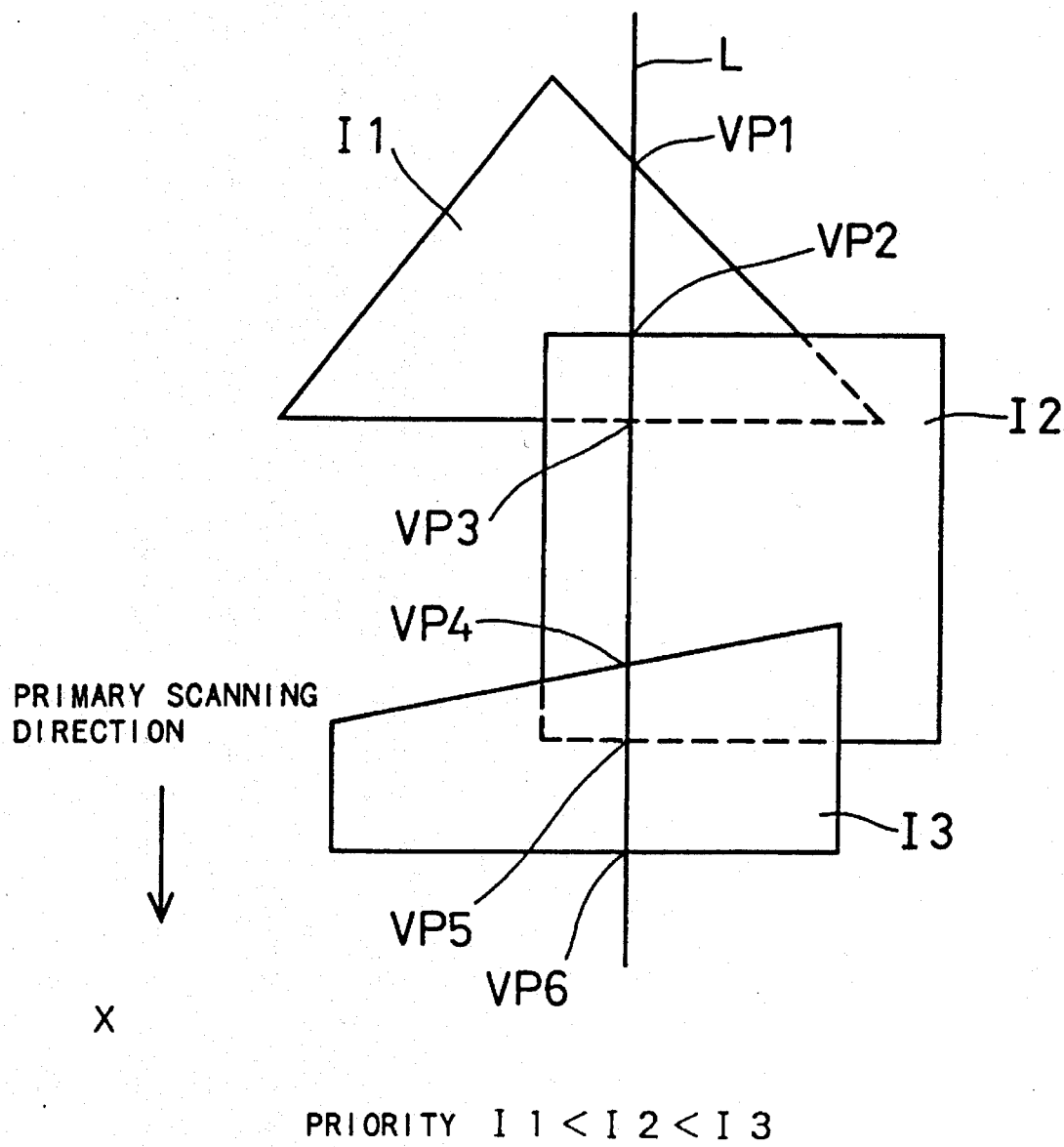
FIG. 20 shows a method of generating output instruction data in printing.

When the plurality of image parts are laid one upon another, output instruction data is generated so that the image part with the lower number in the storing sequence on the RAM 16 or the higher priority is outputted first. FIG. 20 shows a specific process of generating such output instruction data. In a first step, an imaginary line L is drawn in a primary scanning direction x. After determination of the intersections VP1 through VP6 between image parts I1, I2, and I3 and the imaginary line L, the two intersections VP3 and VP5, each changing over to the image part with the lower priority or the higher storing sequence on the RAM 16, are omitted. The output instruction data is subsequently generated corresponding to the residual intersections VP1, VP2, VP4, and VP6. After execution of step S510, the program exits from the routine.

As described above, an image of a page, including one or a plurality of image parts, where selected process information is stored, is output from the image recording unit 28 according to the page image recording routine.

In the embodiment described above, the CPU 10 receives a command for starting execution of the automatic reproduction process, and judges a positional relation between each pair of target image parts in an image of a page. When two target image parts are not separated on an image of one page, specific process information according to the rule base RB is automatically selected for printing with the two image parts. This frees the operator from troublesome manual operation, thus providing an efficient and stable selection of process information.

The selected process information stored between the image parts is generated as a new image part according to the contents stored in the process information table TBL3. This allows for efficient recording of the page image.

In the above embodiment, one of the first through fourth icons ICN21 through ICN24 corresponding to the first through fourth pages is selected in the second window W2, and drawn to a desired process title T1, T2, or T3 for starting the process corresponding to the selected process title T1, T2, or T3. Alternatively, one of the icons ICN11 through ICN13 each representing a whole page data Dp in the first window W1 may be drawn to the desired process title T1, T2, or T3 for starting the required process. This allows processing for all of the pages stored in the page data Dp by one instruction only.

Although sequence data representing the positional sequence of the image parts in the page image is indirectly set according to the storing sequence of the image parts on the RAM 16 in this embodiment, the sequence data may be set directly corresponding to the image parts.

When three (or more) image parts I1, I2, and I3 are connected with and laid over one another as shown in FIG. 20, specific process information is selected and stored both between the first image part I1 and the second image part I2 overlapped with each other, and between the second image part I2 and the third image part I3 also overlapped with each other.

There may be changes, modifications, and alterations without departing from the scope or spirit of essential characteristics of the invention, and it is thereby clearly understood that the above embodiment is only illustrative and not restrictive in any sense. The spirit and scope of the present invention is only limited by the terms of the appended claims.

WHAT IS CLAIMED IS:

1. An apparatus for selecting process information representing a specific prepress process for an image of a page including a plurality of image parts, said apparatus comprising:

an image part memory for storing (i) respective figure data representing a shape and a position of each of said plurality of image parts in said image of a page, (ii) respective attribute data representing a type and a color of each of said plurality of image parts, and (iii) respective ordinal data representing an order of laying out each of said plurality of image parts in said image of a page;

selection means for selecting respective figure data corresponding to two image parts of said plurality of image parts out of said figure data stored in said image part memory;

positional relation judging means for judging whether said two image parts corresponding to said selected figure data are separated from one another on said image of a page;

attribute data reading means for reading respective attribute data and respective ordinal data corresponding to said two image parts from said image part memory if said two image parts are not separated on said image of a page;

process information allocation means for allocating process information to said two image parts based on said attribute data and said ordinal data corresponding to said two image parts; and a process information memory for storing said process information allocated to said two image parts by said process information allocation means.

2. An apparatus in accordance with claim 1, further comprising:

a rule memory for storing an inference rule which has said order of laying out of image parts and types and colors of image parts as a condition part, and said process information as an action part; and wherein said process information allocation means comprises:

rule collating means for applying said inference rule to said attribute data and said ordinal data for said two image parts so as to obtain said process information for said two image parts.

3. An apparatus in accordance with claim 2, wherein said color in said attribute data is expressed by dot percents of color plates of yellow, magenta, cyan, and black, and said apparatus further comprises:

color density computing means for computing a color density of each of said two image parts based on said dot percents of color plates; and spreading part determination means for selecting a spreading image part out of said two image parts based on said color densities and said types in said attribute data of said two image parts, said spreading image part being spread so as to generate a spread area, and generating spreading side data corresponding to said spreading image part.

4. An apparatus in accordance with claim 3, further comprising:

image part generating means for generating said spread area based on said figure data for said two image parts and said spreading side data, said spread area being subject to a prepress process represented by said process information for said two image parts.

5. An apparatus in accordance with claim 3, further comprising:

spread area color determination means for determining a color of said spread area based on colors of said two image parts.

6. An apparatus in accordance with claim 2, wherein said process information includes first through third process titles, said first process title indicating a process of producing an overlapping area between two image parts, said second process title indicating a process of making a margin of a predetermined width around a contour of an image part, said third process title indicating a process of printing a black character over a background; and said process information allocation means further comprises:

means for giving a first priority to said third process title, and a second priority to said second process title, and selecting one process title of said process information according to said priorities when said rule collating means extracts at least two process titles out of said first through third process titles.

7. An apparatus in accordance with claim 1, wherein said ordinal data represents positions of storing said figure data in said image part memory.

8. An apparatus in accordance with claim 1, further comprising:

process information display means for displaying a process title included in said process information for said two image parts in the vicinity of said two image parts displayed on a display device, and two line segments connecting said process title with said two image parts, respectively.

9. An apparatus in accordance with claim 1, said apparatus further comprising:

image part generating means for generating a new image part between said two image parts, said new image part being subject to a prepress process represented by said process information for said two image parts.

10. An apparatus in accordance with claim 9, said apparatus further comprising:

recording means for recording said new image part, and said two image parts corresponding to said figure data selected by said selection means on a recording medium.

11. A method for selecting process information representing a specific prepress process for an image of a page including a plurality of image parts, said method comprising the steps of:

(a) storing (i) respective figure data representing a shape and a position of each of said plurality of image parts in said image of a page, (ii) respective attribute data representing a type and a color of each of said plurality of image parts, and (iii) respective ordinal data representing an order of laying out of each of said plurality of image parts in said image of a page;

(b) selecting respective figure data corresponding to two of said image parts of said plurality of image parts out of said aforementioned figure data;

(c) judging whether said two image parts corresponding to said figure data selected in step (b) are separated from one another on said image of a page;

(d) reading respective attribute data and respective ordinal data corresponding to said two image parts stored in step (a) if said two image parts are not separated on said image of a page;

(e) allocating process information to said two image parts based on said attribute data and said ordinal data corresponding to said two image parts; and (f) storing said process information allocated to said two image parts in step (e).

12. A method in accordance with claim 11, further comprising the step of:

(g) storing an inference rule which has said order of laying out of image parts and types and colors of image parts as a condition part, and said process information as an action part;

wherein step (e) comprises the step of:

(e-1) applying said inference rule to said attribute data and said ordinal data for said two image parts so as to obtain said process information for said two image parts.

13. A method in accordance with claim 12, wherein said color in said attribute data is expressed by dot percents of color plates of yellow, magenta, cyan, or black; and said method further comprises the steps of:

(h) computing a color density of each of said two image parts based on said dot percents of said color plates; and (i) selecting a spreading image part out of said two image parts based on said color densities and said types in said attribute data of said two image parts, said spreading image part being spread so as to generate a spread area, and generating spreading side data corresponding to said spreading image part.

14. A method in accordance with claim 13, further comprising the step of:

(j) generating said spread area based on said figure data for said two image parts and said spreading side data, said spread area being subject to a prepress process represented by said process information for said two image parts.

15. A method in accordance with claim 13, further comprising the step of:

(k) determining a color of said spread area based on colors of said two image parts.

16. A method in accordance with claim 12, wherein said process information includes first through third process titles, said first process title indicating a process of producing an overlapping area between two image parts, said second process title indicating a process of making a margin of a predetermined width around a contour of an image part, said third process title indicating a process of printing a black character over a background; and said step (e) further comprising the step of:

(e-2) giving a first priority to said third process title, and a second priority to said second process title, and selecting one process title of said process information according to said priorities when at least two process titles being extracted in said step (e-1) out of said first through third process titles.

17. A method in accordance with claim 11, wherein said ordinal data represents positions of storing said figure data stored in said step (a).

18. A method in accordance with claim 11, further comprising the step of:

(l) displaying a process title included in said process information for said two image parts in the vicinity of said two image parts displayed on a display device, and two line segments connecting said process title with said two image parts, respectively.

19. A method in accordance with claim 11, said method further comprising the step of:

(m) generating a new image part between said two image parts, said new image part being subject to a prepress process represented by said process information for said two image parts.

20. A method in accordance with claim 19, said method further comprising the step of:

(n) recording said new image part, and said two image parts corresponding to said figure data selected in step (b) on a recording medium.

* * * * *